(No Model.)
J. A. LIDBACK.
HOLDING DEVICE FOR SPRING ACTUATED SHADES.
No. 529,179. Patented Nov. 13, 1894.
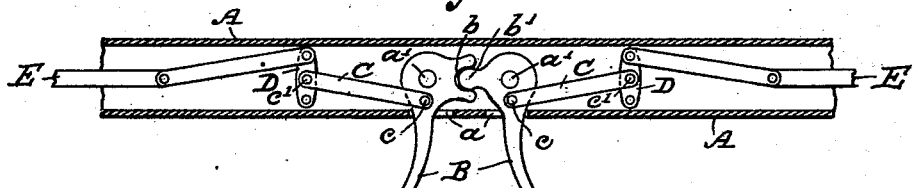
Fig. 1.
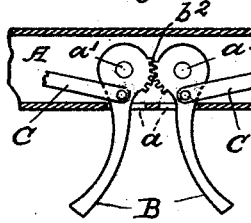 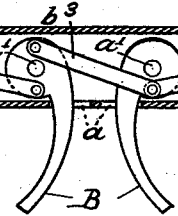 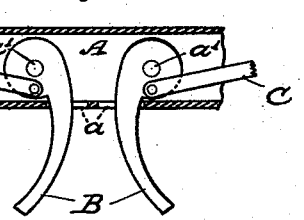
Fig. 2.   Fig. 3.   Fig. 4.
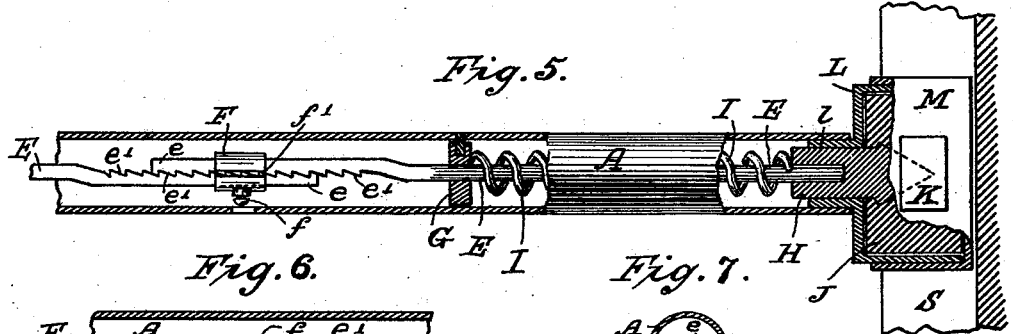
Fig. 5.
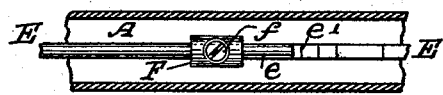
Fig. 6.   Fig. 7.
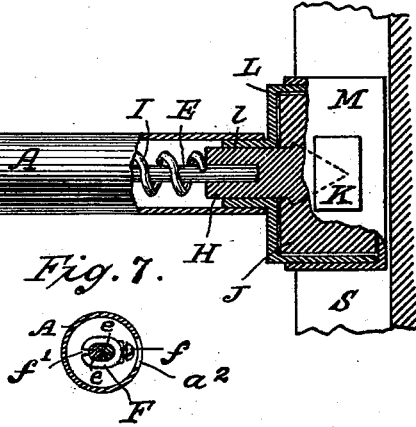
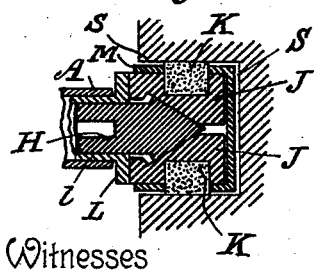 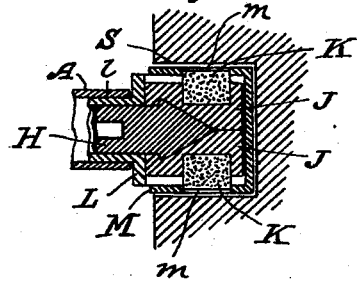 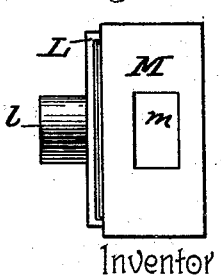
Fig. 8.   Fig. 9.   Fig. 10.
Witnesses
F. A. Merrill
C. J. Palch
Inventor
John A. Lidback
By his Attorney J. B. Thurston

UNITED STATES PATENT OFFICE.

JOHN A. LIDBACK, OF PORTLAND, MAINE, ASSIGNOR TO EDWARD T. BURROWES, OF SAME PLACE.

HOLDING DEVICE FOR SPRING-ACTUATED SHADES.

SPECIFICATION forming part of Letters Patent No. 529,179, dated November 13, 1894.

Application filed July 5, 1894. Serial No. 516,627. (No model).

*To all whom it may concern:*

Be it known that I, JOHN A. LIDBACK, a citizen of the United States, residing at Portland, in the county of Cumberland and State of Maine, have invented certain new and useful Improvements in Expansion Holding Devices for Spring-Actuated Shades; and I do hereby declare the following to be a full, clear, and exact description of the invention, such as will enable others skilled in the art to which it appertains to make and use the same.

My present invention consists broadly in the employment of expansion holding devices operating against the sides of a groove in the window-casing, and in the novel means of adjusting the spring-actuated rods to the required length, without the necessity of taking down the various parts of the mechanism for its accomplishment; which will be fully explained in the following specification and claims, and clearly illustrated in the accompanying drawings, forming a part of the same, of which—

Figure 1, is a sectional elevation of a part of my improvements. Fig. 2, shows a portion of the shade stick, and a pair of my improved presser-pendants for releasing the holding devices, in modified form. Fig. 3, is a similar view, showing another modification of my improved presser-pendants. Fig. 4, represents still another modification of the presser-pendants. Fig. 5, is a sectional elevation, showing a portion of a shade stick to which my improvements are applied. Fig. 6, shows a portion of a shade stick in section, and the adjustable portion of one of my improved spring-actuated rods in elevation. Fig. 7, is a cross-section of the parts shown in Fig. 6. Fig. 8, is a sectional plan view, showing my improved holding device as when expanded in the groove in the window-casing. Fig. 9, is a similar view of the same parts as when the holding device is relaxed or contracted, so as to permit free movement of the shade stick. Fig. 10, is a detached elevation showing one of my improved shells or caps for inclosing the holding device at one end of a shade stick in the groove in the window-casing, and also the means for connecting said shell or cap with the shade stick.

Similar reference letters denote corresponding parts in all the views.

A, is a hollow shade stick having perforations $a\ a$, through which the presser-pendants B, for relaxing the holding devices, will protrude. The presser-pendants are pivoted at, $a'$ to the shade stick, and their movement may be rendered identical, or rather, they may be made to move in unison, by sort of a ball and socket connection such as seen in Fig. 1, in which two projections on one of the pendants form a socket $b$, for the reception of the projection $b^2$, formed upon the other pendant; or, spur-teeth $b'$, may connect the one with the other, as shown in Fig. 2; or, they may be connected by a link $b^3$, as in Fig. 3; but their connection is not at all essential, for they will perform their function when separated, or disconnected, as shown in Fig 4.

If desired, the spring-actuated rods may be connected to the presser-pendants, direct, but I prefer to interpose a suitable compound leverage, whereby the movement of the spring-actuated rods may be greater than that of the presser-pendants. Hence in the drawings I show the connecting rods C, one end of which attach to either presser-pendant at $c$, their other ends being attached at $c'$, to a lever D; said lever being pivoted at one end to the shade stick A, and at the other, to either of the spring-actuated rods E, as shown.

In order to render the spring-actuated rods readily adjustable, so that they may be easily fitted to different lengths of shade sticks, each rod may be made in two sections and connected by a sleeve or collar clasping the overlapping ends of the sections. This construction is carried out in Figs. 5, 6, and 7, and the adjacent surfaces of the overlapping ends $e$, are provided with serrations, $e'$; and after placing these serrated ends as desired, they may be secured by a close fitting collar F, which, for the purpose of additional security, may be provided with a set-screw $f$, in which case a perforation $a^2$, should be formed at the proper point in the stick A, for the entrance of a screw-driver. If however, the collar F, be made open, as shown best in Fig. 7, it may be sprung so tightly upon the overlapping ends e, as to require no tightening screw.

Each spring-actuated rod will pass through a stop collar G, and into a conical, or wedge-shaped expander H, between which and said stop-collar each rod will be provided with a helical spring I, acting normally to press the rods outward, as shown in Fig. 5. The holding devices operate against the sides of a groove S, formed for this purpose in the window-casing.

The holding devices for each groove S, are made in two sections J, divided vertically, so as to be expanded against the sides of groove, each section being grooved as at j, to fit one side, or half, of either expander H, as shown best in Fig. 8. The top and bottom edges of the sections J, rest within a yoke L, having a cylindrical projection l, which fits either end of the shade stick A, and through which either expander H, passes and is adapted to move longitudinally. The sections J, are provided each with an elastic plug K, for contact with the sides of the groove S, and the said yoke L, is preferably provided with an oblong shell or cap, M, inclosing the said yoke and sections J, as shown in the drawings. This cap M, is made a close fit for the yoke L, and a loose fit for the sections J. Normally, the elastic friction plugs K, protrude through openings m, formed for this purpose in the sides of the cap M, as seen in Fig. 8; but when the pressure of the expander H, between the sections J, is relaxed, the sections J, and their elastic friction plugs K, will assume more nearly the position shown in Fig. 9, thus permitting the shell, or cap M, to move up, or down, in the groove S, with but slight friction.

Having fully described my improvements, what I claim as new is—

1. In holding devices for spring-actuated shades, comprising a hollow shade stick, spring-actuated rods therein, and presser-pendants for operating the rods, suitable conical or wedge-shaded expanders attached one to the outer end of each of said rods, and holding devices formed in two parts and separable horizontally, each part being grooved for the reception of the expander whereby the said holding devices may be forced against the sides of the groove in the window-casing.

2. In holding devices for spring-actuated shades, comprising a hollow shade stick, spring-actuated rods therein, and presser-pendants for operating the rods, suitable conical or wedge-shaped expanders attached one to the outer end of each of said rods, holding devices formed in two parts and separable horizontally, said parts being grooved in their adjacent surfaces for the reception of the expander, and provided upon their outer surface with a suitable elastic friction plug, and a shell or cap inclosing devices, provided with an opening in each side for the accommodation of the friction plugs of said holding devices, substantially for the purpose set forth.

3. In holding devices for spring-actuated shades the combination of a hollow shade stick, spring-actuated rods therein each being formed of two parts, one part overlapping the other and their contacting surfaces being serrated, and provided with a removable sleeve or collar capable of holding the serrated interlocking parts firmly together, presser-pendants attached to the adjacent ends of said rods and conical or wedge shaped expanders attached to their outer ends, and holding devices fitting over said expanders and separable horizontally, whereby said holding devices may be forced against the sides of the groove in the window-casing.

4. In holding mechanism for spring-actuated shades comprising a hollow shade stick, spring-actuated rods therein, having holding devices at their outer ends adapted for contact with the window-casing, suitable presser pendants attached to their adjacent ends for operating the said rods, said presser-pendants being connected and adapted for movement in unison, and equal one with the other.

In testimony whereof I affix my signature in presence of two witnesses.

JOHN A. LIDBACK.

Witnesses:
ROBERT P. SMITH,
HELO H. KING.